US010546307B2

(12) United States Patent
Gatti et al.

(10) Patent No.: US 10,546,307 B2
(45) Date of Patent: Jan. 28, 2020

(54) METHOD, APPARATUSES, AND COMPUTER PROGRAM PRODUCTS FOR AUTOMATICALLY DETECTING LEVELS OF USER DISSATISFACTION WITH TRANSPORTATION ROUTES

(71) Applicant: International Business Machines Corporation, Armonk, NY (US)

(72) Inventors: Maira Athanazio De Cerqueira Gatti, Rio de Janeiro (BR); Akiko Suzuki, Tokyo-to (JP); Lucas C. Villa Real, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/036,114

(22) Filed: Sep. 25, 2013

(65) Prior Publication Data
US 2015/0088599 A1    Mar. 26, 2015

(51) Int. Cl.
*G06Q 30/02*    (2012.01)
*G06Q 50/26*    (2012.01)

(52) U.S. Cl.
CPC ......... *G06Q 30/0201* (2013.01); *G06Q 50/26* (2013.01)

(58) Field of Classification Search
CPC .................... G06Q 30/0201; G06Q 50/26
See application file for complete search history.

(56) References Cited

U.S. PATENT DOCUMENTS

| | | | |
|---|---|---|---|
| 4,044,860 A * | 8/1977 | Kaneko | B66B 1/34 187/392 |
| 4,222,111 A | 9/1980 | Sloan et al. | |
| 7,394,404 B2 | 7/2008 | Kim | |
| 7,532,958 B2 | 5/2009 | Powers et al. | |
| 7,957,871 B1 * | 6/2011 | Echeruo | G01C 21/3626 104/27 |
| 8,306,848 B1 * | 11/2012 | Naphade | G06F 17/30241 705/7.31 |

(Continued)

OTHER PUBLICATIONS

Velazco (2012) "Social Transit App Moovit Launches in New York City, Just in Time to Help All Those Hapless Tourists" (retrieved from http://techcrunch.com/2012/12/20/social-transit-app-moovit-launches-in-new-york-city-just-in-time-to-help-all-those-hapless-tourists/).*

(Continued)

*Primary Examiner* — Sujay Koneru
(74) *Attorney, Agent, or Firm* — Harrington & Smith

(57) ABSTRACT

An aspect of this invention is a method that includes monitoring sensors to collect information for a transportation route, and generating a graph from the collected information where the graph includes a plurality of nodes, each node representing a stop on the at least one transportation route. Each of respective nodes is associated with a corresponding transportation stop density and a corresponding passenger leaving rate. The corresponding transportation stop density is compared with at least one predetermined density threshold and the corresponding passenger leaving rate is compared with at least one predetermined leaving rate threshold to determine a level of dissatisfaction for each of the respective nodes. A tangible output is generated that identifies a level of user dissatisfaction for each of the plurality of nodes.

13 Claims, 7 Drawing Sheets

(56) References Cited

U.S. PATENT DOCUMENTS

| | | | |
|---|---|---|---|
| 8,972,190 B1* | 3/2015 | Pech | G06Q 10/047 |
| | | | 701/540 |
| 2005/0096998 A1* | 5/2005 | Gieselmann et al. | 705/26 |
| 2005/0258980 A1 | 11/2005 | Conover | |
| 2006/0074544 A1 | 4/2006 | Kim | |
| 2006/0116965 A1* | 6/2006 | Kudo | G06Q 99/00 |
| | | | 705/52 |
| 2008/0027772 A1* | 1/2008 | Gernega et al. | 705/7 |
| 2008/0229966 A1* | 9/2008 | Luger | B61B 1/02 |
| | | | 104/173.1 |
| 2010/0253549 A1* | 10/2010 | Kim | G08G 1/123 |
| | | | 340/994 |
| 2010/0299177 A1* | 11/2010 | Buczkowski | G06Q 10/06 |
| | | | 705/7.13 |
| 2010/0322516 A1* | 12/2010 | Xu | G06K 9/00778 |
| | | | 382/173 |
| 2011/0112759 A1* | 5/2011 | Bast | G01C 21/3423 |
| | | | 701/533 |
| 2011/0161138 A1* | 6/2011 | Keaveny et al. | 705/7.38 |
| 2011/0221615 A1 | 9/2011 | Chin | |
| 2012/0069131 A1 | 3/2012 | Abelow | |
| 2012/0197685 A1* | 8/2012 | Mays | G06Q 30/02 |
| | | | 705/7.34 |
| 2012/0278130 A1* | 11/2012 | Kim | H04W 16/22 |
| | | | 705/7.31 |
| 2013/0226446 A1* | 8/2013 | Nonner | G01C 21/00 |
| | | | 701/400 |
| 2013/0304378 A1* | 11/2013 | Graells | G01C 22/00 |
| | | | 701/533 |
| 2014/0189096 A1* | 7/2014 | Miller et al. | 709/224 |
| 2014/0278616 A1* | 9/2014 | Stone et al. | 705/6 |
| 2015/0058049 A1* | 2/2015 | Shaw | 705/5 |
| 2015/0286936 A1* | 10/2015 | Furuya | B61L 27/0027 |
| | | | 706/58 |
| 2016/0012724 A1* | 1/2016 | Ahiko | G08G 1/127 |
| | | | 340/994 |

OTHER PUBLICATIONS

Budiono, Oktiani Astuti, "Customer Satisfaction in Public Bus Transport", 2009, 56 pgs.

Eboli, Laura, et al., "Service Quality Attributes Affecting Customer Satisfaction for Bus Transit", Journal of Public Transportation, vol. 10, No. 3, 2007, pp. 21-34.

Friman, Margareta, et al., "Service Supply and Customer Satisfaction in Public Transportation: the Quality Paradox", Journal of Pubic Transportation, vol. 12, No. 4, 2009, pp. 57-69.

Lin, Cheng-Yu, et al., "A Comfort Measuring System for Public Transportation Systems Using Participatory Phone Sensing", National Science Council of Taiwan, 5 pgs.

\* cited by examiner

| Density | Leaving Rate | Threshold Range for densities criticality | Threshold Range for leaving rate criticality | Colors (examples) |
|---|---|---|---|---|
| High $D_i$ | High $LRi$ | $\rho_i^c > \kappa$ | $\sigma_i^c > \kappa'$ | Orange |
| High $D_i$ | Low $LRi$ | $\rho_i^m \leq \rho_i^h < \rho_i^c$ | $\sigma_i^m \leq \sigma_i^h < \sigma_i^c$ | Gray |
| Low $D_i$ | High $LRi$ | $\rho_i^l \leq \rho_i^m < \rho_i^h$ | $\sigma_i^l \leq \sigma_i^m < \sigma_i^h$ | Blue |
| Low $D_i$ | Low $LRi$ | $0 \leq \rho_i^l < \rho_i^m$ | $0 \leq \sigma_i^l < \sigma_i^m$ | Pink |

FIG. 6

METHOD, APPARATUSES, AND COMPUTER PROGRAM PRODUCTS FOR AUTOMATICALLY DETECTING LEVELS OF USER DISSATISFACTION WITH TRANSPORTATION ROUTES

TECHNICAL FIELD

The exemplary embodiments of this invention relate generally to communications networks and more particularly to methods, apparatuses, and computer program products for automatically detecting levels of user dissatisfaction with transportation routes.

BACKGROUND

Cities and urbanized areas feature extensive networks of public transportation systems including buses operating on fixed routes, elevated trains, subways, regular rail systems, and dial-a-ride vans. However, many people are dissatisfied with public transportation because none of the available options present an efficient solution to their transportation needs. Although public transit is usually less expensive than using a personal automobile, the inefficiencies associated with adhering to a rigid schedule, traveling to an inconveniently located station, and waiting for long periods of time to board an overcrowded transportation vehicle, prevent many potential users from considering public transit as a viable option. For example, buses suffer from the limitation of operating on the same roads and highways that are used by individual automobiles, making it difficult or impossible for a bus to adhere to a fixed, dependable schedule during typical rush hour conditions. In some cities, passenger trains and freight trains must share the same set of rails, oftentimes resulting in unanticipated delays.

In areas of low to medium population density, train stations and bus stops are often widely spaced and may not be conveniently accessed by all potential users. Although dial-a-ride vans are equipped to pick up and drop off riders at customer-specified locations, these vans must be prearranged in advance on an as-available basis and are only intended for the occasional trip, not for regular daily use. Coordinating transfers between various vehicles or modes of transportation, especially where the user is changing between vehicles operated by different transit operators, is another problem.

From the standpoint of customers and users, one potential solution for addressing dissatisfaction with public transportation is to provide real-time feedback regarding the estimated arrival times of the vehicles in the network and their current locations within an urban area. For example, infrared, radio-frequency, or Bluetooth communication links are employed in some urban areas to update digital display panels at train stations or bus stops. These display panels indicate the schedules, arrival times, and delays associated with each of a plurality of transportation routes.

Other potential solutions may address dissatisfaction with public transportation from the perspective of a centralized operational control center. The quality of services provided to users may be enhanced by collecting data from transit operators and transit vehicles over a period of time. An algorithm is applied to the collected data to determine routes that, for the greatest number of users, will minimize fares, travel times, travel distance, or the number of required transfers. The data may be collected and analyzed using route and stop information for the network, a driver and vehicle availability list, and information gathered by on-board vehicle equipment. This information may be gathered, for example, using a global positioning (GPS) locator, an idle monitoring system, and a vehicle status monitor. The collected data may pertain to the lengths and locations of delays, as well as variations in arrival times from day to day.

Although various solutions have been proposed for improving public transportation, user dissatisfaction remains a significant problem. Moreover, as the population of cities and urban areas increases, it is expected that the number of passengers and transit vehicles on the public transportation network will increase beyond current levels. Over time, the efficiency of the transportation network will degrade if the elements of the network are not properly optimized, thereby leading to further user dissatisfaction. Moreover, with the current emphasis on encouraging public transportation as a means for reducing pollution and decreasing our dependence on fossil fuel, the need to optimize transportation networks is greater now than ever before.

SUMMARY

In one aspect thereof the exemplary embodiments of this invention provide a computer-executable method comprising: monitoring one or more sensors to collect information for at least one transportation route; generating one or more graphs from the collected information where each of the graphs includes a plurality of nodes, each node representing a stop on the at least one transportation route, each of respective nodes being associated with a corresponding transportation stop density and a corresponding passenger leaving rate; comparing the corresponding transportation stop density with at least one predetermined density threshold and comparing the corresponding passenger leaving rate with at least one predetermined leaving rate threshold to determine a level of dissatisfaction for each of the respective nodes; and generating a tangible output identifying a level of user dissatisfaction for each of the plurality of nodes.

In another aspect thereof, the exemplary embodiments provide a computer-readable memory that contains computer program instructions, where the execution of the computer program instructions by at least one data processor results in performance of operations which comprise: monitoring one or more sensors to collect information for at least one transportation route; generating one or more graphs from the collected information where each of the graphs includes a plurality of nodes, each node representing a stop on the at least one transportation route, each of respective nodes being associated with a corresponding transportation stop density and a corresponding passenger leaving rate; comparing the corresponding transportation stop density with at least one predetermined density threshold and comparing the corresponding passenger leaving rate with at least one predetermined leaving rate threshold to determine a level of dissatisfaction for each of the respective nodes; and generating a tangible output identifying a level of user dissatisfaction for each of the plurality of nodes.

In yet another aspect thereof, the exemplary embodiments provide a data processing system that comprises at least one data processor connected with at least one memory that stores computer program instructions for monitoring one or more sensors to collect information for at least one transportation route; generating one or more graphs from the collected information where each of the graphs includes a plurality of nodes, each node representing a stop on the at least one transportation route, each of respective nodes being associated with a corresponding transportation stop density and a corresponding passenger leaving rate; comparing the corresponding transportation stop density with at least one predetermined density threshold and comparing the corresponding passenger leaving rate with at least one predetermined leaving rate threshold to determine a level of dissatisfaction for each of the respective nodes; and generating a tangible output identifying a level of user dissatisfaction for each of the plurality of nodes.

BRIEF DESCRIPTION OF THE SEVERAL VIEWS OF THE DRAWINGS

FIG. 6 is a table relating a plurality of density levels and a plurality of leaving rate levels to a plurality of dissatisfaction levels.

DETAILED DESCRIPTION

Figure 1:
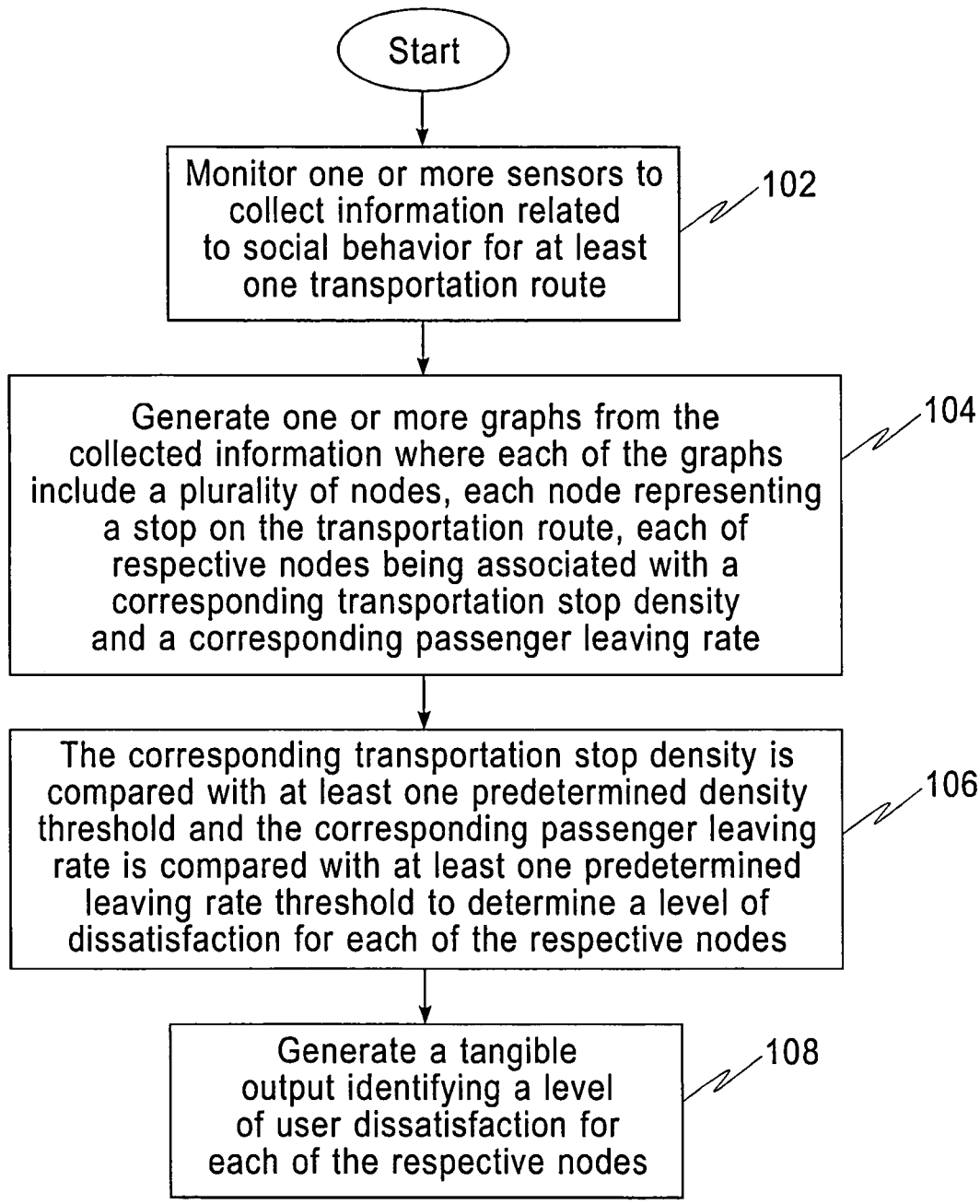
FIG. 1 is a flowchart that illustrates a first exemplary operational sequence for implementing and practicing the embodiments of the invention.

FIG. 1 is a flowchart that illustrates an exemplary operational sequence for implementing and practicing the embodiments of the invention. The operational sequence commences at block 102 where one or more sensors are monitored to collect information for at least one transportation route. Next, at block 104, one or more graphs are generated from the collected information. Each of the graphs includes a plurality of nodes, each node representing a stop on the transportation route. Each of respective nodes is associated with a corresponding transportation stop density and a corresponding passenger leaving rate. The operational sequence advances to block 106 where the corresponding transportation stop density is compared with at least one predetermined density threshold and the corresponding passenger leaving rate is compared with at least one predetermined leaving rate threshold to determine a level of dissatisfaction for each of the respective nodes. At block 108, a tangible output is generated that identifies a level of user dissatisfaction for each of the plurality of nodes, wherein groups of nodes represent transportation routes. Illustratively, this tangible output is provided in the form of a printout, a display, or information stored in a tangible computer-readable storage medium.

Figure 2:
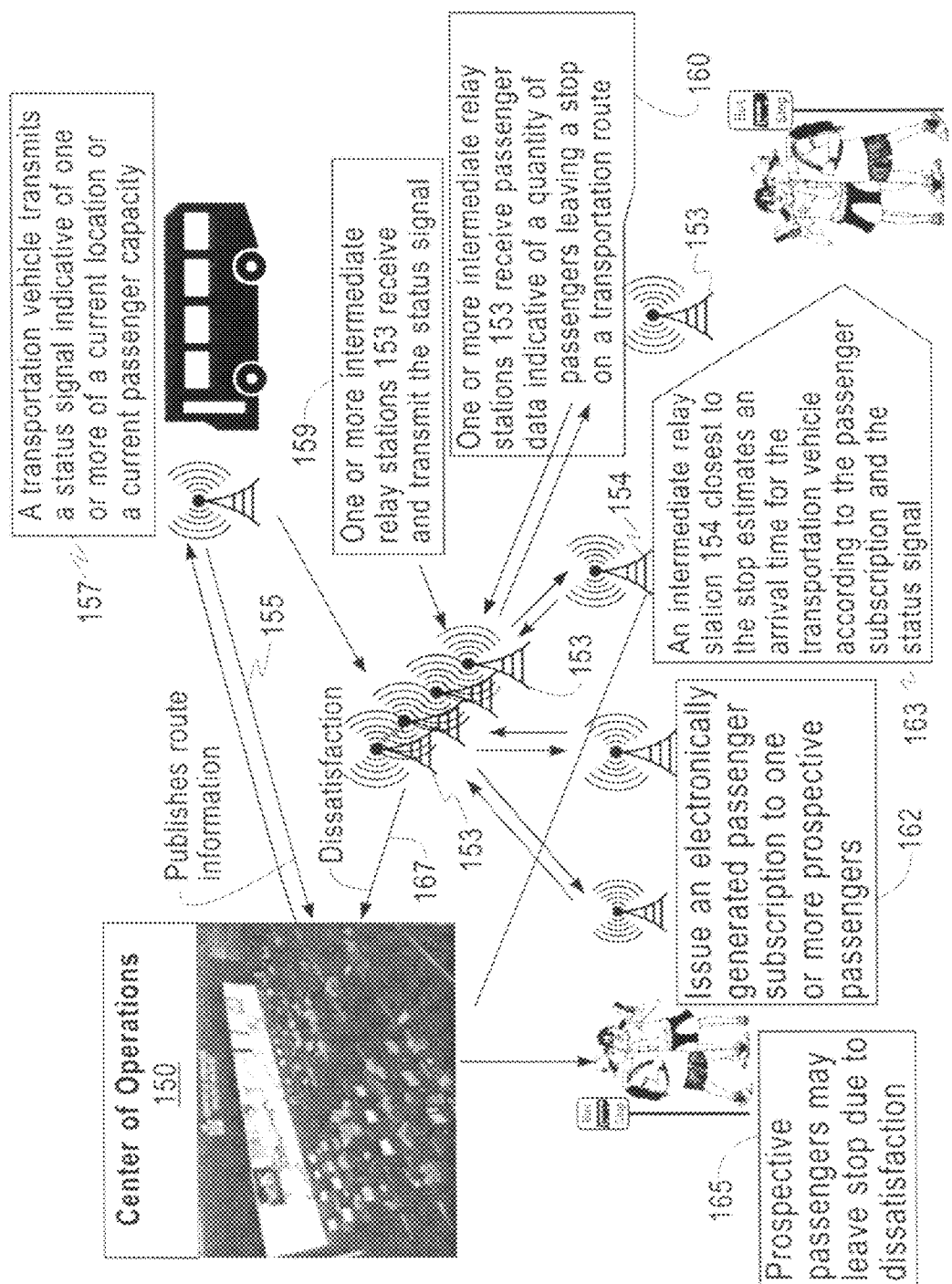
FIG. 2 is a flowchart that illustrates a second exemplary operational sequence for implementing and practicing the embodiments of the invention.

FIG. 2 is a flowchart that illustrates a second exemplary operational sequence for implementing and practicing the embodiments of the invention. A center of operations 150 for a transportation network electronically publishes route information 155 for each of a plurality of transportation routes. The route information may be published, for example, using a radio frequency transmitter or transceiver, fiber optic cable, copper cable, another type of wired or wireless communication link, or any of various combinations thereof. At block 157, a transportation vehicle transmits a status signal indicative of one or more of a current location or a current passenger capacity for the transportation vehicle.

The operational sequence of FIG. 2 progresses to block 159 where one or more intermediate relay stations 153 receive and transmit the status signal so that the status signal is received at the center of operations 150. At block 160, one or more of the intermediate relay stations 153 receive passenger data indicative of a quantity of passengers leaving a stop on a transportation route. An electronically generated passenger subscription is issued to one or more prospective passengers at block 162. The electronically generated passenger subscription may, but need not, be issued in response to receiving a request from a prospective passenger who may wish to utilize a specified stop or station along a specified transportation route. The electronically generated passenger subscription is a subscription to receive one or more electronic notifications in connection with an expected arrival of a transportation vehicle for the specified transportation route at the specified stop or station. At block 163, an intermediate relay station 154 closest to the stop estimates an arrival time for the transportation vehicle in accordance with the passenger subscription and the status signal. If a prospective passenger is required to wait too long at a stop before the transportation vehicle arrives, the passenger may leave the stop due to dissatisfaction (block 165).

Figure 3:
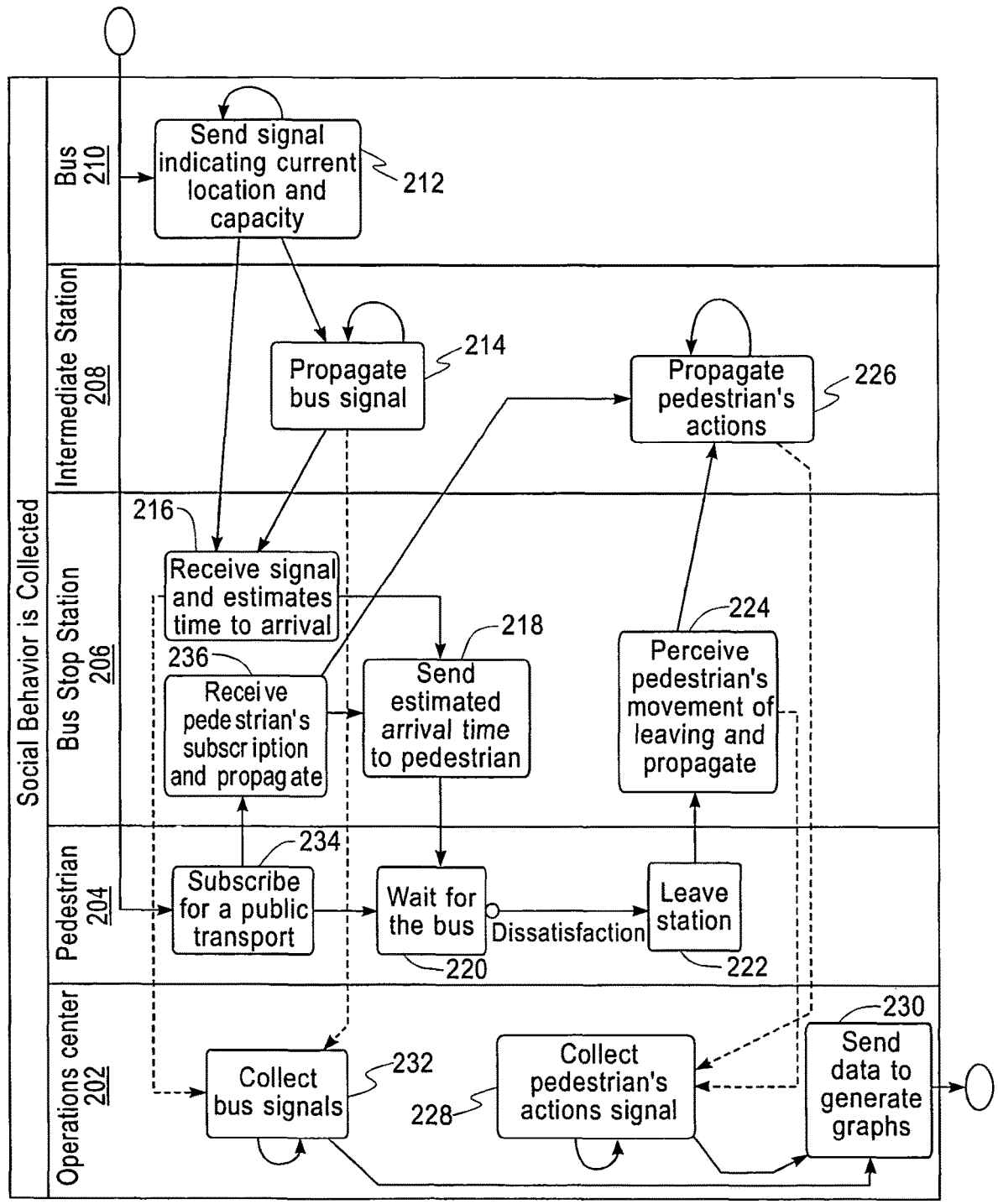
FIG. 3 is a flowchart that illustrates a third exemplary operational sequence for implementing and practicing the embodiments of the invention.

FIG. 3 is a flowchart that illustrates a third exemplary operational sequence for implementing and practicing the embodiments of the invention. In the illustrative example of FIG. 3, it is assumed that the transportation vehicle is a bus, and it is further assumed that the prospective passenger is a pedestrian. However, the operational sequence is also applicable to types of transportation vehicles other than a bus including, for example, trains, railcars, vans, airplanes, boats, ferries, or taxicabs. The operational sequence is also applicable to prospective passengers who may not be pedestrians, such as prospective passengers who are at home or at work, as well as current passengers who are presently traveling on a transportation vehicle.

The operational sequence of FIG. 3 commences at block 212 where a status signal indicating a current location and a current passenger capacity is transmitted by a transmitter at a bus 210. This transmission may take place over a wireless communication link. The current passenger capacity may, but need not, be defined as the difference between the maximum capacity of the bus and the current occupancy level of the bus 210 or other transportation vehicle. With reference to block 216, in some situations, the status signal is received directly by a transceiver at a bus stop station 206. With reference to block 214, in other situations, the status signal is received by a transceiver at an intermediate station 208 that, in turn, transmits the received status signal. At block 216, the status signal transmitted by the transceiver at the intermediate station 208 is then received by a transceiver at the bus stop station 206.

In response to the receipt of the status signal at the bus stop station 206 transceiver, the transceiver forwards the status signal to a processor that calculates an expected arrival time for the bus 210. The processor sends the calculated arrival time to the bus stop station 206 transceiver, and the bus stop station transceiver 206 sends the estimated arrival time to a pedestrian 204 (block 218). The processor may be located at the bus stop station 206, at an operations center 202, or elsewhere. At block 220, the pedestrian 204 waits for the bus 210. If the pedestrian 204 becomes dissatisfied, at block 222, the pedestrian 204 may leave the bus stop station 206. Illustratively, the pedestrian 204 might leave the bus stop station 206 if the waiting period for the arrival of the bus 210 at the bus stop station 206 is undesirably long.

At block 224, the act of the pedestrian leaving the bus stop station 206 is detected by a sensor at the bus stop station 206. This sensor may, but need not, be implemented using an infrared motion detector or other type of motion detection mechanism. Status information from the sensor is coupled to the bus stop station 206 transceiver and the bus stop station 206 transceiver transmits the sensor status information to the transceiver at the intermediate station 208. The transceiver at the intermediate station 208 transmits the sensor status information to a transceiver at the operations center 202 (block 226). An operations center 202 processor coupled to the transceiver at the operations center 202 collects sensor status information continuously, repeatedly, periodically, or over a period of time (block 228). This operations center 202 processor may, but need not, be the same processor as was previously described with reference to calculating an arrival time.

The operations center 202 processor stores collected and processed sensor status information in a non-transitory computer readable storage medium. The operations center 202 processor uses the collected, processed, and stored sensor status information to generate one or more graphs (block 230), as will be described in greater detail hereinafter with reference to FIG. 4. The operations center 202 processor collects status signals from the bus 210 continuously, repeatedly, periodically, or over a period of time (block 232). From time to time (blocks 234 and 236), a request for an electronic subscription to a given bus 210 route may be received from the pedestrian 204. The electronic subscription is received by the bus stop station transceiver 206. The request is received by the transceiver at the intermediate station 208. The transceiver at the intermediate station 208 transmits the request to a transceiver at the operations center 202 (block 226). The request is then processed by the operations center 202 processor (block 228) and used to generate one or more graphs (block 230). The graphs generated by the operations center 202 processor are used by the operations center 202 processor to formulate a response to the request for the electronic subscription received from the pedestrian 204. The formulated response is sent to the pedestrian 204 (block 234).

Figure 4:
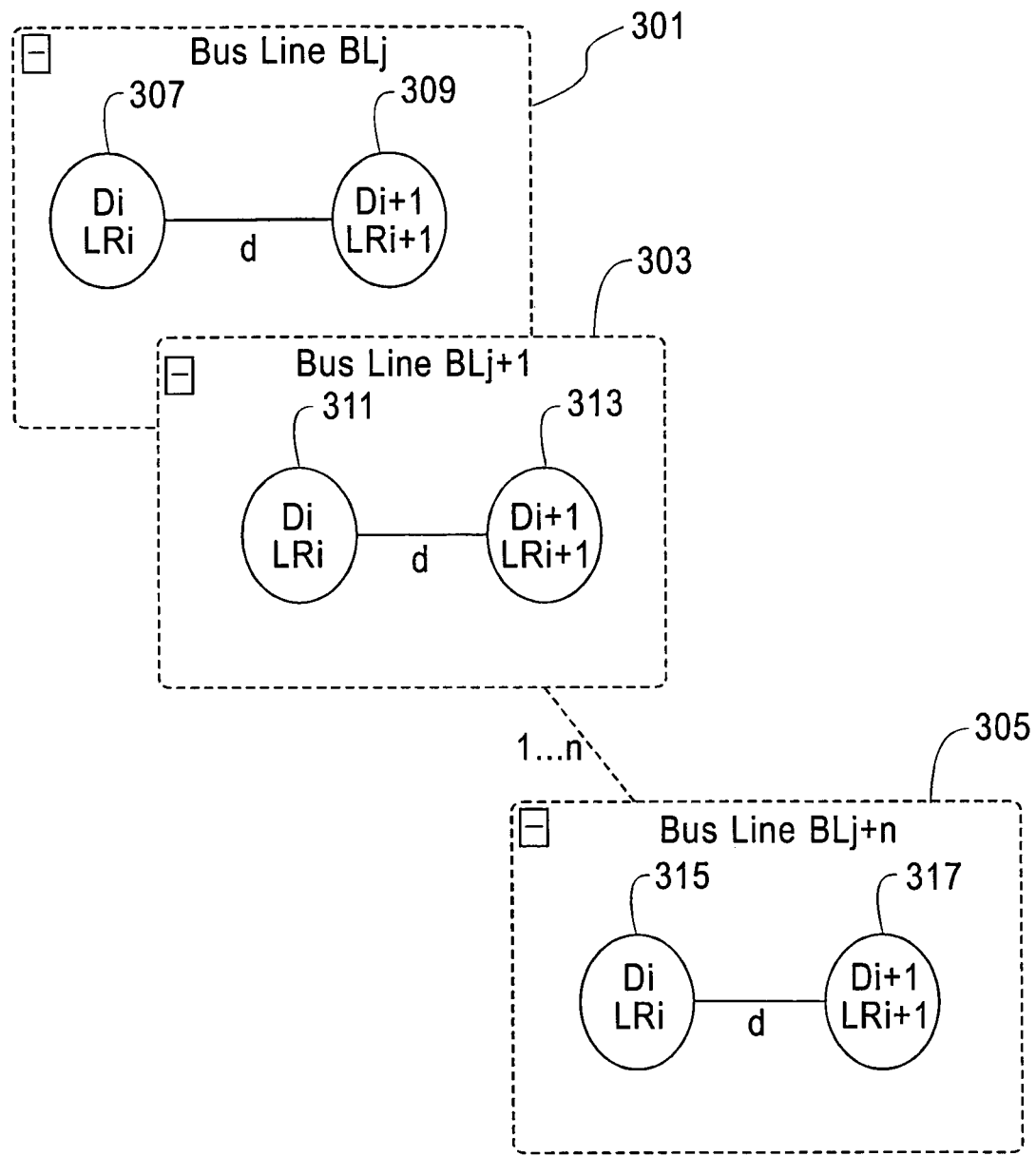
FIG. 4 is a data structure diagram that illustrates an exemplary technique for generating the graphs of FIG. 3.

FIG. 4 is a data structure diagram that illustrates an exemplary technique for generating the graphs of FIG. 3. For each of a plurality of respective bus lines or transportation routes, a corresponding graph is generated. For example, a first graph 301 is generated for a first bus line $BL_j$, a second graph 303 is generated for a second bus line $BL_{j+1}$, and a third graph 305 is generated for an $n^{th}$ bus line $BL_{j+n}$. Each graph 301, 303, 305 includes a plurality of nodes. The first graph 301 includes a first node 307 and a second node 309. The second graph 303 includes a third node 311 and a fourth node 313. The third graph 305 includes a fifth node 315 and a sixth node 317.

Each node 307, 309, 311, 313, 315, 317 represents a stop on a transportation route. In the illustrative example of FIG. 4, the transportation route is a bus route and the specific stops are bus stops. $D_i$ represents a density D for a bus stop i where density may be defined as a total number or quantity of people who are waiting for the arrival of a specified bus (or other transportation vehicle) at a particular moment in time, but not limited to this definition, where the specified bus (or other transportation vehicle) is associated with a desired transportation route. $BL_j$ represents the bus line) j and $LR_i$ represents the pedestrian (or prospective passenger) leaving rate at the bus stop i. The leaving rate LR may be defined as a total number or quantity of people who leave a stop on a transportation route prior to the arrival of the transportation vehicle for the desired transportation route. The leaving rate is indicative of a level of dissatisfaction associated with a given or desired transportation route in the sense that some people may leave the stop due to frustration with lengthy waiting times.

By determining one or more criticalities, dissatisfaction of passengers and prospective passengers is calculated at any of two different levels including a bus line level and a bus stop station level. For example, a bus line may be considered critical if:

$$D_i^{BL}{}_j \text{ is greater than or equal to } \rho_i$$

AND $$LR_i^{BL}{}_j \text{ is greater than or equal to } \sigma_i$$

where $\rho_i$ represents a set of density thresholds and $\sigma_i$ is the threshold for the leaving rate at bus stop station i. A bus stop station is critical if there exists $\exists\, D_i^{BL}{}_j$ greater than or equal to $\rho_i$.

Figure 5:
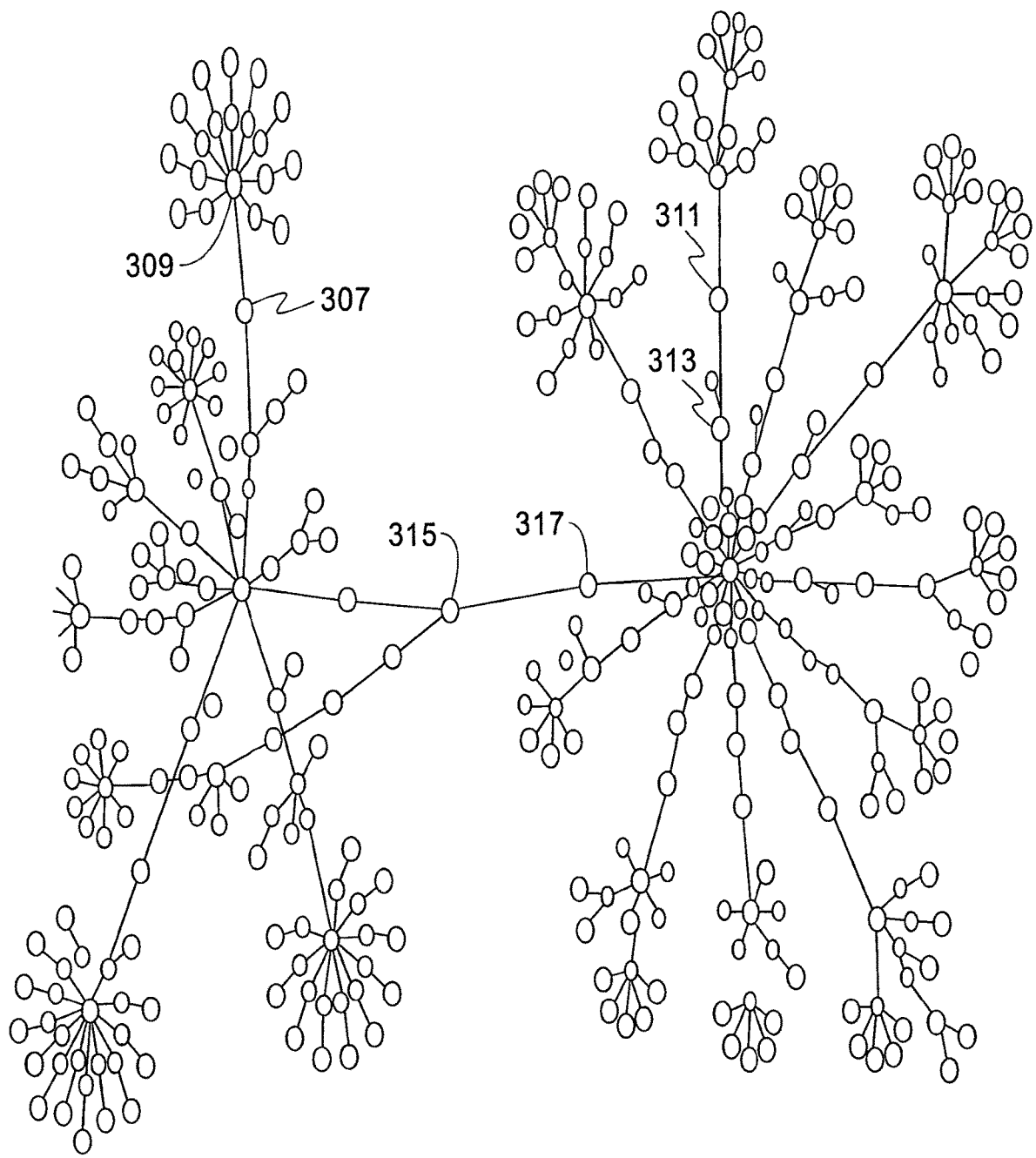
FIG. 5 is a data structure diagram that illustrates an exemplary technique for combining the graphs of FIG. 3 to provide a dissatisfaction level associated with one or more paths or transportation routes.

FIG. 5 is a data structure diagram that illustrates an exemplary technique for combining the generated graphs of FIG. 3 to provide a dissatisfaction level associated with one or more paths or transportation routes. Each node 307, 309, 311, 313, 315, and 317 (FIGS. 4 and 5) represents a stop on a transportation route. For purposes of illustration, these stops may, but need not, be bus stops. For each node 307, 309, 311, 313, 315, and 317, the density $D_i$ is determined as the number or quantity of people who are waiting at a given stop (i.e., node) for a bus (or other transportation vehicle) that travels on a desired transportation route.

The number or quantity of people at a given stop may be detected or determined using any of the techniques described previously in conjunction with FIG. 3. More specifically, publish/subscriber methods may be utilized where electronic subscription requests are received from prospective passengers of the desired transportation route, and the requests are processed to publish or transmit a notification message to these prospective passengers. The notification message is indicative of an arrival time for a transportation vehicle on the desired transportation route. Additionally or alternatively, the notification message is indicative that a transportation vehicle on the desired transportation route is approaching a given stop.

For example, if a first prospective passenger is waiting at a particular bus stop in the Upper West side of Manhattan, then a notification is sent to the first prospective passenger. If a second prospective passenger is walking along Eighth Avenue and has requested to travel on a bus serving Route 11, then a notification is sent to the second prospective passenger when the Route 11 bus is approaching the current location of the second prospective passenger. For each node 307, 309, 311, 313, 315, and 317, the leaving rate LR is determined as the number or quantity of people leaving a given stop corresponding to the node, wherein each of these people had previously issued an electronic subscription request for a given transportation route or had previously issued an electronic subscription request for any transportation route serving the given stop.

FIG. 6 is a table relating a plurality of Density $D_i$ levels and a plurality of Leaving Rate LR levels to a plurality of dissatisfaction levels. For example, a first or critical level of dissatisfaction is characterized by high Density $D_i$ levels and high Leaving Rate $LR_i$ levels. This critical level, illustratively designated by the color orange, may be defined as achieving at least a minimum threshold for Density $D_i$ where a critical density threshold $\rho_i^C$ is greater than κ, and also achieving at least a minimum threshold for Leaving Rate $LR_i$ where a critical leaving rate threshold $\sigma_i^C$ is greater than κ'. In this example, κ and κ' each represent a desired maximum value of a constant to be selected in accordance with the specifics of a given system application.

A second or high level of dissatisfaction is characterized by high Density $D_i$ levels and low Leaving Rate $LR_i$ levels. This high level, illustratively designated by the color gray, may be defined as the Density $D_i$ achieving a high density threshold $\rho_i^H$ that falls within a range between a medium density threshold $\rho_i^M$ and the critical density threshold $\rho_i^C$, and the Leaving Rate $LR_i$ achieving a high leaving rate threshold $\sigma_i^H$ that falls within a range between a medium leaving rate threshold $\sigma_i^M$ and the critical leaving rate threshold $\sigma_i^C$.

A third or medium level of dissatisfaction is characterized by low Density $D_i$ levels and high Leaving Rate $LR_i$ levels. This medium level, illustratively designated by the color blue, may be defined as the Density $D_i$ achieving the medium density threshold $\rho_i^M$ that falls within a range between the low density threshold $\rho_i^L$ and the high density threshold $\rho_i^H$, and the Leaving Rate $LR_i$ achieving the medium leaving rate threshold $\sigma_i^M$ that falls within a range between the low leaving rate threshold $\sigma_i^L$ and the high leaving rate threshold $\sigma_i^H$.

A fourth or low level of dissatisfaction is characterized by low Density $D_i$ levels and low Leaving Rate $LR_i$ levels. This low level, illustratively designated by the color pink, may be defined as the Density $D_i$ achieving the low density threshold $\rho_i^L$ that falls within a range between zero and the medium density threshold $\rho_i^M$, and the Leaving Rate $LR_i$ achieving the low leaving rate threshold $\sigma_i^L$ that falls within a range between zero and the medium leaving rate threshold $\sigma_i^M$.

Figure 7:
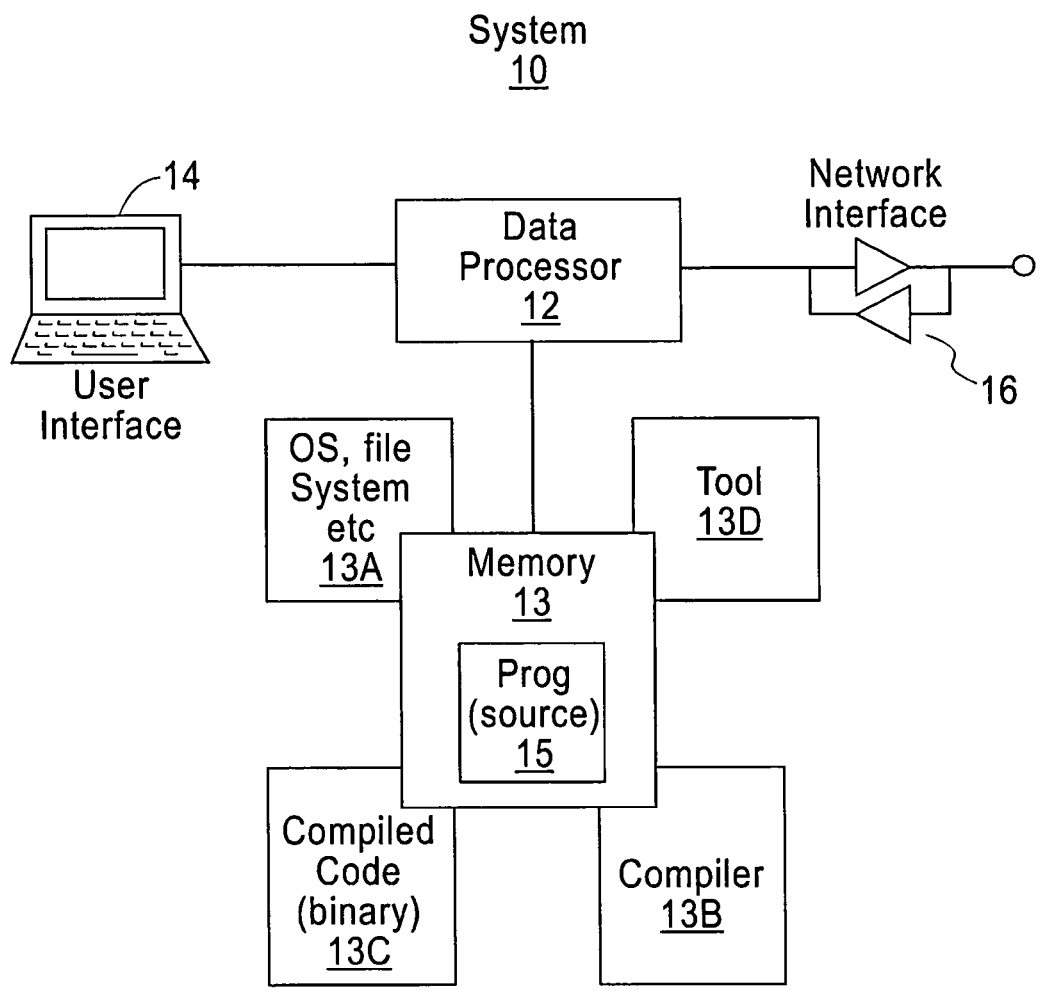
FIG. 7 is a block diagram of an exemplary computer system or data processing system that can be used to implement and practice the embodiments of this invention.

FIG. 7 is a block diagram of an exemplary computer system or data processing system 10 that can be used to implement and practice the embodiments of this invention. The system 10 includes at least one data processor 12 connected with at least one memory 13. The memory 13 stores data and programs, such as an operating system (OS) 13A and related programs such as a file system. The memory 13 also stores an application program 15 (source code) written by a programmer or programmers using, for example, a local user interface 14 and/or a remote user interface via a suitable network interface 16. The application program 15 can be, for example, any application that is written in a programming language designed to communicate instructions to a machine. An exemplary target configuration for the application program 15 can be a network comprised of nodes 307, 309, 311, 313, 315, 317 as shown in FIGS. 4 and 5 and described previously. Another exemplary target configuration for the application program 15 can be any of the operations center 202 processor or the processor at the bus stop station 206 as was previously described in connection with FIG. 2.

The memory 13 (FIG. 2) stores a program that implements a compiler 13B. The compiler 13B produces compiled code 13C from the application program 15. For illustrative purposes, one suitable compiler is the XL UPC Compiler that is available from the assignee of this patent application. The memory 13 can also store a further program that implements a tool 13D that operates in accordance with the exemplary embodiments of the invention. The tool 13D can be invoked by the programmer using, for example, the user interface 14. The tool 13D enables the programmer to at least analyze shared memory accesses by the application program 15.

Note that the tool 13D need not be instantiated in the memory 13, and could be resident on another system such as on another physical system connected through the network interface 16, or on a virtual system in a cloud computing environment. That is, the tool 13D need not be co-resident in the same memory as the compiler 13B and/or the compiled code 13C and/or the source code (application program) 15.

As should be appreciated by one skilled in the art, aspects of the present invention may be embodied as a method, a computer-readable memory, a data processing system, a semiconductor device for implementing a smart network node, or as a combination of these. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "device", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, devices, apparatuses, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method comprising:
   receiving, as inputs to one or more computers, one or more physical sensor signals from one or more sensors, wherein said inputs represent information for at least one transportation route of a transportation network configured by an operations center processor;
   transforming the physical sensor signals into transportation route information to be stored in one or more data structures on the one or more computers,
      wherein the transportation route information comprises stop densities of one or more stops on the transportation route, and a prospective passenger leaving rate of one or more stops on the transportation route,
      wherein the stop density represents the quantity of people who are waiting at one or more of the stops for a transportation vehicle that travels on a desired transportation route,
      wherein the prospective passenger leaving rate represents a number of prospective passengers wishing to use the transportation network not using the transportation network by leaving a respective stop, and
      wherein each of the number of people wishing to use the transportation network as a prospective passenger had previously issued an electronic subscription request for a particular transportation route or had previously issued an electronic subscription request for any transportation route serving the particular stop;
   determining a level of dissatisfaction for each of the respective stops by comparing, by the one or more computers, the corresponding transportation stop density with at least one predetermined density threshold and comparing the corresponding prospective passenger leaving rate with at least one predetermined leaving rate threshold;

generating one or more graphs from the collected information where each of the graphs include a plurality of nodes, each node representing a stop on the transportation route, each of respective nodes being associated with a corresponding transportation stop density, a corresponding passenger leaving rate, and a tangible output identifying the level of dissatisfaction; and wherein the tangible output is utilized by the operations center to provide, to a user via a graphical user interface, a visual designation corresponding to a range into which the level of dissatisfaction falls, in accordance with the electronic subscription request.

2. The method of claim 1, wherein the transportation network comprises a plurality of routes.

3. The method of claim 2, wherein a route comprises a grouping of stops.

4. The method of claim 3, wherein the grouping is served by one vehicle.

5. The method of claim 1, wherein a prospective user is a person previously issuing an electronic subscription request for a transportation route serving a stop of the plurality of stops.

6. The method of claim 5, further comprising responding to the electronic subscription request by transmitting a notification associated with an expected arrival of a transportation vehicle for the at least one transportation route at the stop.

7. The method of claim 6, further comprising receiving a status signal from the transportation vehicle indicating at least one of the following for the transportation vehicle:
a current location, or
a current passenger capacity.

8. The method of claim 7, further comprising estimating an arrival time for the transportation vehicle at the stop according to the electronic subscription request and the status signal.

9. The method of claim 1, wherein the transportation route information comprises motion sensed indicating one or more prospective users leaving prior to an arrival of a transportation vehicle.

10. The method of claim 1 wherein the at least one predetermined density threshold comprises at least a critical density threshold and a non-critical density threshold.

11. The method of claim 1, wherein the at least one predetermined leaving rate threshold comprises at least a critical leaving rate threshold and a non-critical leaving rate threshold.

12. A data processing system that comprises at least one data processor connected with at least one memory that stores computer program instructions for:
receiving, as inputs to one or more computers, one or more physical sensor signals from one or more sensors, wherein said inputs represent information for at least one transportation route of a transportation network configured by an operations center processor;
transforming the physical sensor signals into transportation route information to be stored in one or more data structures on the one or more computers,
wherein the transportation route information comprises stop densities of one or more stops on the transportation route, and a prospective passenger leaving rate of one or more stops on the transportation route,
wherein the stop density represents the quantity of people who are waiting at one or more of the stops for a transportation vehicle that travels on a desired transportation route,
wherein the prospective passenger leaving rate represents a number of prospective passengers wishing to use the transportation network not using the transportation network by leaving a respective stop, and
wherein each of the number of people wishing to use the transportation network as a prospective passenger had previously issued an electronic subscription request for a particular transportation route or had previously issued an electronic subscription request for any transportation route serving the particular stop;
determining a level of dissatisfaction for each of the respective stops by comparing, by the one or more computers, the corresponding transportation stop density with at least one predetermined density threshold and comparing the corresponding prospective passenger leaving rate with at least one predetermined leaving rate threshold;
generating one or more graphs from the collected information where each of the graphs include a plurality of nodes, each node representing a stop on the transportation route, each of respective nodes being associated with a corresponding transportation stop density, a corresponding passenger leaving rate, and a tangible output identifying the level of dissatisfaction; and
wherein the tangible output is utilized by the operations center to provide, to a user via a graphical user interface, a visual designation corresponding to a range into which the level of dissatisfaction falls, in accordance with the electronic subscription request.

13. A computer program product embodied on a non-transitory computer-readable medium in which a computer program is stored that, when being executed by a computer, is configured to provide instructions to control or carry out:
receiving, as inputs to one or more computers, one or more physical sensor signals from one or more sensors, wherein said inputs represent information for at least one transportation route of a transportation network configured by an operations center processor,
transforming the physical sensor signals into transportation route information to be stored in one or more data structures on the one or more computers,
wherein the transportation route information comprises stop densities of one or more stops on the transportation route, and a prospective passenger leaving rate of one or more stops on the transportation route,
wherein the stop density represents the quantity of people who are waiting at one or more of the stops for a transportation vehicle that travels on a desired transportation route,
wherein the prospective passenger leaving rate represents a number of prospective passengers wishing to use the transportation network not using the transportation network by leaving a respective stop, and
wherein each of the number of people wishing to use the transportation network as a prospective passenger had previously issued an electronic subscription request for a particular transportation route or had previously issued an electronic subscription request for any transportation route serving the particular stop;
determining a level of dissatisfaction for each of the respective stops by comparing, by the one or more computers, the corresponding transportation stop density with at least one predetermined density threshold and comparing the corresponding prospective passenger leaving rate with at least one predetermined leaving rate threshold;

generating one or more graphs from the collected information where each of the graphs include a plurality of nodes, each node representing a stop on the transportation route, each of respective nodes being associated with a corresponding transportation stop density, a corresponding passenger leaving rate, and a tangible output identifying the level of dissatisfaction; and wherein the tangible output is utilized by the operations center to provide, to a user via a graphical user interface, a visual designation corresponding to a range into which the level of dissatisfaction falls, in accordance with the electronic subscription request.

\* \* \* \* \*